United States Patent [19]

Ehrig et al.

[11] Patent Number: 4,707,524

[45] Date of Patent: Nov. 17, 1987

[54] CONTROLLED-RHEOLOGY POLYPROPYLENE

[75] Inventors: Raymond J. Ehrig, Pittsburgh; Richard C. Weil, Monroeville Borough, both of Pa.

[73] Assignee: Aristech Chemical Corporation, Pittsburgh, Pa.

[21] Appl. No.: 860,356

[22] Filed: May 6, 1986

[51] Int. Cl.$^4$ .............................................. C08F 8/00
[52] U.S. Cl. ................................. 525/387; 525/333.8
[58] Field of Search .......................................... 525/387

[56] References Cited

U.S. PATENT DOCUMENTS 3,144,436 8/1964 Greene et al. ........................ 525/387
3,887,534 6/1975 Baba et al. .......................... 525/387
3,940,379 2/1976 Castagna et al. .................... 525/387
4,271,279 6/1981 Pastorino et al. ................... 525/387
4,451,589 5/1984 Morman et al. ..................... 525/387

Primary Examiner—Joseph L. Schofer
Assistant Examiner—B. Lipman
Attorney, Agent, or Firm—William L. Krayer

[57] ABSTRACT

Small amounts of peroxides which do not decompose to TBA and which have a half-life in the range of about 1.0 to 10 hrs. at 128° C. are incorporated in polypropylene by thermal mechanical melting in an extruder. Control of molecular weight and molecular weight distribution is achieved as a function of the amount of peroxide added. The peroxides of choice are 2,2 di(t-amyl) peroxy propane and 3,6,6,9,9 pentamethyl-3 n-propyl-1,2,4,5 tetraoxacyclononane.

8 Claims, No Drawings

CONTROLLED-RHEOLOGY POLYPROPYLENE

TECHNICAL FIELD

This invention relates to the elimination of tert-butyl alcohol (TBA) while reducing the molecular weight and narrowing the molecular weight distribution of polypropylene during extrusion.

When organic peroxides are mixed with polypropylene in the melt phase, the polymer is caused to degrade to a lower molecular weight. The resulting polypropylene also has a narrower molecular weight distribution than the starting material and exhibits improved flowability during the fabrication of finished plastic products. Commercial polypropylenes, produced in the presence of organic peroxides, are known as controlled-rheology (CR) resins. Although a wide variety of peroxides is available, one specific peroxide, [2,5 dimethyl-2, 5-bis(t-butylperoxy) hexane], because of its particular decomposition temperature, is the peroxide of choice used throughout the industry to produce CR polymers. Lupersol 101, sold by the Lucidol Division of Pennwalt Corp., is such a peroxide.

Although CR resins made with Lupersol 101 exhibit good processability, the resins contain varying quantities of TBA. When heated, these resins give off the objectionable odor of TBA. Also, government regulations have recently limited the quantity of TBA present in polypropylene resins or products to 25 ppm.

BACKGROUND ART

Prior to the present invention, it has been known that the processability of polypropylene improves by introducing into the polypropylene, after its manufacture, a small amount of a peroxide compound. The peroxide compound is typically added to polypropylene particulates or pellets prior to their introduction to an extruder, sometimes in an inert gas, to melt them by heat and/or the mechanical energy of the screw or mixer, and to extrude them as pellets, film, or sheet having controlled, predictable flow properties.

Peroxide compounds are referred to in U.S. Pat. No. 3,144,436 as free radical initiators; in this patent they are employed in extruders to modify the melt index of the product.

Aliphatic peroxides are employe, also with crystalline polypropylene powder, in U.S. Pat. No. 3,887,534, modifying the intrinsic viscosity and the melt flow.

Controlled oxidative degradation of polypropylene is also achieved through the use of certain other peroxides, in U.S. Pat. No. 3,940,379; this patent emphasizes the essentially color and odor-free characteristics of the product obtained through minimal thermal degradation together with maximum oxidative degradation.

Several patents teach the cross-linking of polyethylene through the use of peroxides—see U.S. Pat. Nos. 3,846,396, 3,725,455, 3,917,745, and 3,963,673.

One of the peroxide compounds which we employ, 3,6,6,9,9 pentamethyl-3 n-propyl-1,2,4,5 tetraoxacyclononane, is included in the generic formula of a group of peroxides disclosed in U.S. Pat. No. 4,271,279 as useful for cross-linking polyethylene. A compound also within that generic formula is shown in U.S. Pat. No. 4,451,589 to be useful for improving the processability of propylene copolymers.

The reader may also be interested in U.S. Pat. No. 4,460,750 which shows the formation of transparent film of ethylene copolymers by treatment of peroxides.

DISCLOSURE OF INVENTION

The common tendency of many prior art peroxide additives to emit TBA is eliminated with the use of our invention, wherein the particular peroxides used to modify the processing characteristics of polypropylene are chosen because of their ability to degrade the polypropylene in a controlled manner, with the desired half-life, and without the formation of TBA.

The present invention eliminates the formation of TBA during the production of CR polymer by peroxidic degradation. The process can be conducted in the presence of absence of air. The product also exhibits better color and equivalent processability and physical properties compared with resins produced with Lupersol 101. This is achieved by the use of 2,2 di(t-amyl) peroxy propane (Lupersol 553 from Lucidol) or 3,6,6,9,9 pentamethyl-3 n-propyl-1,2,4,5 tetraoxacyclononane (Esperal 529 from Peroxygen Division of Witco Chem.).

In the process of this invention, known amounts of peroxides are premixed with polypropylene powder containing conventional additives or stabilizers under a nitrogen atmosphere. The polypropylenes with which our invention is effective include copolymers with up to 10% ethylene. The polypropylene/peroxide mixtures are added, with a nitrogen purge, to a mixer or extruder and preheated to 180° C. while mixing.

Our peroxide materials should be added to the polypropylene pellets, flake or powder in concentrations of 50 to 10,000 ppm. The components (polypropylene powder, peroxide, and additives) may be premixed at room temperature and then in an extruder at a temperature not exceeding 550° F., or the polypropylene powder and additives can be premixed at room temperature and fed concurrently with a peroxide to an extruder, or thirdly all the ingredients can be preblended in a heated mixer, not exceeding 550° F., prior to adding to an extruder. The mixture should be processed at a temperature of 350° to 550° F.

Our materials are peroxide compounds having a half-life of from 1.0 to 10 hrs. at 128° C. and which do not degrade into TBA. This means, that, under the conditions for extrusion described above, no peroxide material will be left in the polypropylene. Specifically our materials are selected from the group consisting of 2,2 di(t-amyl) peroxy propane and 3,6,6,9,9 pentamethyl-3 n-propyl-1,2,4,5 tetraoxacyclononane. Using a Banbury mixer at 20 rpm, when all the sample is added, the mixing speed is increased to 80 rpm, and mixing is continued for 1 to 3 minutes, at 180° C., under a 10 kg ram weight. At the end of this time period, the material is transferred and cooled, under nitrogen, and ground to a powder. When this procedure was followed, comparative molecular weights and TBA contents were determined on the samples. The results are given in Table I.

TABLE I

| Peroxide | ppm | $\overline{M_z}$ | $\overline{M_w}$ | $\overline{M_n}$ | $\dfrac{\overline{M_w}}{\overline{M_n}}$ | TBA (ppm) |
|---|---|---|---|---|---|---|
| Lupersol 101 | 2000 | 340,000 | 153,000 | 48,000 | 3.2 | 110 |
| Lupersol 553 | 2000 | 424,000 | 195,000 | 45,000 | 4.3 | 0 |
| Esperal 529 | 2000 | 527,000 | 231,000 | 44,000 | 5.3 | 0 |
| Lupersol 101 | 7000 | 298,000 | 118,000 | 35,000 | 3.4 | 435 |

TABLE I-continued

| Peroxide | ppm | $\overline{Mz}$ | $\overline{Mw}$ | $\overline{Mn}$ | $\dfrac{\overline{Mw}}{\overline{Mn}}$ | TBA (ppm) |
|---|---|---|---|---|---|---|
| Lupersol 553 | 7000 | 259,000 | 112,000 | 29,000 | 3.7 | 0 |
| Esperal 529 | 7000 | 232,000 | 116,000 | 35,000 | 3.3 | 0 |

Similar tests conducted in a one-inch Yellow Jacket extruder yielded the results stated in Table II.

TABLE II

| | Molecular Weight Data[1] | | | | |
|---|---|---|---|---|---|
| Sample Description | $\overline{Mn}$ $10^3$ | $\overline{Mw}$ $10^3$ | $\dfrac{\overline{Mw}}{\overline{Mn}}$ | $\overline{Mz}$ $10^3$ | MF |
| Lupersol 553-M75 1000 ppm | 48.6 | 202 | 4.16 | 452 | 30.7 |
| Lupersol 553-M75 600 ppm | 53.0 | 219 | 4.12 | 513 | 20.4 |
| Lupersol 553-M75 300 ppm | 51.0 | 254 | 4.99 | 673 | 10.0 |
| Lupersol 101 600 ppm | 45.3 | 185 | 4.09 | 403 | 42.4 |
| Base resin | 56.9 | 311 | 5.45 | 963 | 4.6 |

[1]Run at 475° F. melt temperature; accuracy of data ± 5%.

While the results indicate that at the same concentration Lupersol 553 is not as effective as Lupersol 101, the complete elimination of TBA from the system makes it possible to increase the concentration of Lupersol 553, if desired.

Tables III and IV show data collected in two other kinds of extruders.

TABLE III

| Data Generated in 1-in. Killion Extruder[1] | | | |
|---|---|---|---|
| | | Resin[2] | |
| Peroxide | Conc. | MF | TBA Content, ppm |
| Lupersol 101 | .10 wt. % | 102 | 100 |
| Lupersol 553-75 | .10 wt. % | 69 | 0 |
| Esperal 529 | .10 wt. % | 80 | 0 |

[1]Run at 450° F. melt temperature.
[2]Base Resin, MF of 3.2.

TABLE IV

| Data Generated in 2½ in. Davis Standard Extruder Vented[1] | | | |
|---|---|---|---|
| | | Product[2] | |
| Peroxide | Conc. | MF | TBA Content, ppm |
| Lupersol 101 | 0.05 wt. % | 31 | 26 |
| Lupersol 553-75 | 0.05 wt. % | 23 | 0 |
| Esperal 529 | 0.15 wt. % | 58 | 0 |

[1]Run at 500° F. melt temperature.
[2]Base Resin, MF of 3.2.

We claim:

1. Method of modifying the processing characteristics of polypropylene comprising admixing with said polypropylene about 50 to 10,000 ppm of a peroxide compound having a half-life of from about 1 to about 10 hours at 128° C. and which does not degrade into t-butyl alcohol, melting the mixture under thermal mechanical action, and forming a solid polypropylene product free of peroxide compound and free of t-butyl alcohol emissions, whereby the molecular weight of the polypropylene product is reduced, the melt flow is increased, and the molecular weight distribution is made narrower.

2. Method of claim 1 wherein the thermal mechanical action takes place at about 330°-550° F.

3. Method of claim 1 wherein the thermal mechanical action takes place at about 350°-500° F.

4. Method of claim 1 wherein the peroxide compound is admixed at about 40-500 ppm.

5. Method of claim 1 wherein the polypropylene product is pellets.

6. Method of claim 1 wherein the polypropylene contains up to about 10% ethylene.

7. Method of claim 1 wherein the peroxide is 2,2 di(t-amyl) peroxy propane.

8. Method of claim 1 wherein the peroxide is 3,6,6,9,9 pentamethyl-3 n-propyl-1,2,4,5 tetraoxacyclononane.

* * * * *